(12) United States Patent
Kuniba (10) Patent No.: US 7,209,597 B2
(45) Date of Patent: Apr. 24, 2007

(54) IMAGE PROCESSING APPARATUS FOR REDUCING TILE DISTORTION

(75) Inventor: Hideyasu Kuniba, Shinagawa-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/235,066

(22) Filed: Sep. 27, 2005

(65) Prior Publication Data

US 2006/0018558 A1  Jan. 26, 2006

Related U.S. Application Data

(63) Continuation of application No. PCT/JP04/07198, filed on May 20, 2004.

(30) Foreign Application Priority Data

May 27, 2003  (JP) ............... 2003-149136

(51) Int. Cl.
*G06K 9/36* (2006.01)
*G06K 9/40* (2006.01)

(52) U.S. Cl. ..................... 382/268; 382/233

(58) Field of Classification Search .............. 382/268, 382/233; 358/426.02, 426.04
See application file for complete search history.

(56) References Cited

U.S. PATENT DOCUMENTS

| 5,606,372 A |   | 2/1997  | Kim                      |
|-------------|---|---------|--------------------------|
| 5,949,917 A | * | 9/1999  | Kawasaka ......... 382/268 |
| 5,974,196 A | * | 10/1999 | Chang et al. ...... 382/268 |
| 6,041,145 A | * | 3/2000  | Hayashi et al. .... 382/268 |
| 6,144,700 A |   | 11/2000 | Kim                      |
| 6,434,275 B1 | * | 8/2002 | Fukuda et al. ..... 382/275 |
| 6,563,958 B1 | * | 5/2003 | Andrew ............ 382/268 |

(Continued)

FOREIGN PATENT DOCUMENTS

EP  0 884 911 A1  12/1998

(Continued)

OTHER PUBLICATIONS

Chyng J. Kuo et al, "Adaptive Postprocessor for Block Encoded Images", Aug. 1, 1995, IEEE Transactions on Circuits and Systems for Video Technology, vol. 5, No. 4, pp. 298-304.

(Continued)

*Primary Examiner*—Bhavesh M Mehta
*Assistant Examiner*—Jordan Kuhn
(74) *Attorney, Agent, or Firm*—Oliff & Berridge PLC (57) ABSTRACT

An image processing apparatus reduces a distortion that occurs at a tile boundary (tile distortion) when an image is compressed or expanded on a tile-by-tile basis. It is equipped with a tone jump detecting section, a slope calculating section, and a slope correcting section. The tone jump detecting section calculates differences between the values of pixels on both sides of the tile boundary and detects a tone jump in the tile distortion according to the differences. The slope calculating section calculates slope-like correction values to be used for causing the tone jump to approach zero in a prescribed length ((prescribed length)<(tile length)), and adds the slope-like correction values to the values of pixels near the tile boundary. As a result, the steep tone jump due to the tile distortion is corrected into a gentle slope-like variation. Tile distortions are reduced properly by this processing.

7 Claims, 8 Drawing Sheets

U.S. PATENT DOCUMENTS

2003/0053708 A1   3/2003   Kryukov et al.
2003/0185451 A1*  10/2003  Jung .................... 382/233

FOREIGN PATENT DOCUMENTS

| EP | 1 193 649 A1 | 4/2002 |
|----|--------------|--------|
| JP | A 05-014735  | 1/1993 |
| JP | A 07-322262  | 12/1995 |
| JP | A 09-093580  | 4/1997 |
| JP | A 10-51775   | 2/1998 |
| JP | 2002010256 A * | 1/2002 |
| JP | A 2002-010256 | 1/2002 |
| JP | A 2002-024823 | 1/2002 |

OTHER PUBLICATIONS

Bhaskar Ramamurthi et al., "Nonlinear Space-Variant Postprocessing of Block Coded Images", Oct. 1, 1986, IEEE Transactions on Acoustics, Speech and Signal Processing, vol. 34, No. 5, pp. 1258-1268.

* cited by examiner

| | PROCESSED TILE U | | | | | | | |
|---|---|---|---|---|---|---|---|---|
| | Uh1 | Uh2 | Uh3 | Uh4 | Uh5 | Uh6 | • • • • • • • • | Uhw |
| L1w | A11 | A12 | A13 | A14 | A15 | A16 | • • • • • • • | A1w |
| L2w | A21 | | | | | | | A2w |
| L3w | A31 | | | | | | | A3w |
| L4w | A41 | | | UNPROCESSED TILE A | | | | A4w |
| L5w | A51 | | | | | | | A5w |
| L6w | A61 | | | | | | | A6w |
| Lhw | Ah1 | Ah2 | Ah3 | Ah4 | Ah5 | Ah6 | • • • • • • • | Ahw |

PROCESSED TILE L (left side label)

SLOPE ADDING DIRECTIONS

[A]

[B]

[C]

GRADIENT DIRECTION

FIG. 8

IMAGE PROCESSING APPARATUS FOR REDUCING TILE DISTORTION

CROSS REFERENCE TO RELATED APPLICATION

This application is a continuation application of PCT/JP2004/007198, filed on May 20, 2004, and claims the benefit of priority from Japanese Patent Application No. 2003-149136, filed on May 27, 2003, the entire contents of which are incorporated herein by reference.

BACKGROUND OF THE INVENTION

1. Field of the Invention

Discontinuous tile distortions occur at tile boundaries of an image when the image is compressed or expanded on a tile-by-tile basis. The present invention relates to an image processing technique for reducing such tile distortions so that they become less noticeable.

2. Description of the Related Art

In such image compression techniques as JPEG2000, to reduce the capacity of a processing buffer, an image is compressed in units of a small section (tile). In such tile-by-tile image compression techniques, tile distortions occur at tile boundaries of an expanded image when the compression efficiency is increased excessively.

On the other hand, in such image compression techniques as JPEG, image compression is performed by using a very small block of about 8 pixels by 8 pixels as a unit of orthogonal transformation. It is known that block noise occurs even in such processing performed in units of a very small block.

Techniques disclosed in the following Patent documents 1 to 3 are known as techniques for reducing block noise of the above kind.

That is, Patent document 1 discloses a technique in which an average value of the pixels of a subject block is predicted by extrapolating pixel variations of adjacent blocks and pixel values of the subject block are level-shifted uniformly in accordance with the predicted value.

Patent documents 2 and 3 disclose techniques of reducing block noise by filtering block boundary portions.

[Patent document 1] U.S. Pat. No. 5,757,969 specification
[Patent document 2] U.S. Pat. No. 6,115,503 specification
[Patent document 3] U.S. Pat. No. 5,555,029 specification The above-described Patent document 1 employs very small blocks of about 8 pixels by 8 pixels. It is relatively easy to predict an average value of the pixels of such a very small block based on surrounding very small blocks. Even if the prediction should prove wrong, the influence of the erroneous prediction is restricted in the very small block and hence the entire image does not have any noticeable failure.

On the other hand, the invention employs tiles each of which has as large an area as hundreds of pixels or more. Therefore, in the case of tiles, such variable factors as the pattern of each tile have great influence and hence the prediction operation of Patent document 1, for example, fails at a high probability.

Further, large-area tiles have long sidelines. Therefore, with the method of level-shifting pixel values of the entire tile uniformly, even if a tile distortion is removed at one location, new tile distortions may occur at other locations on the sideline.

On the other hand, where the filtering of Patent document 2 is applied to reduction of tile distortions, a problem arises that high-frequency components of an original pattern at a tile boundary may be lost.

SUMMARY OF THE INVENTION

An object of the present invention is therefore to provide a novel technique for reducing tile distortions.

The invention will be summarized below.

An image processing apparatus according to the invention reduces a distortion that occurs at a tile boundary (hereinafter referred to as tile distortion) when an image is compressed or expanded on a tile-by-tile basis. The image processing apparatus includes a tone jump detecting section, a slope calculating section, and a slope correcting section.

The tone jump detecting section calculates differences between the values of pixels located on both sides of the tile boundary and detects a tone jump in the tile distortion according to the differences.

The slope calculating section calculates a slope according to which the tone jump is to approach zero in a prescribed length ((prescribed length)<(tile length)) and calculates correction values for causing such a slope-like value variation.

The slope correcting section corrects the tone jump in the tile distortion into a gentle slope-like variation by correcting the values of pixels near the tile boundary using the slope-like correction values.

It is even preferable that the tone jump detecting section locally smoothes the differences in a tile boundary line direction and calculates a tone jump in the tile distortion according to locally smoothed differences.

It is preferable that the tone jump detecting section calculates a tone jump by performing weighted addition of the differences in a tile boundary direction in such a manner that a difference largely varying from its adjacent difference is given a small weighting, and the larger the variance is, the smaller the weighting is.

It is even preferable that the tone jump detecting section calculates a tone jump by performing weighted addition of the differences in a tile boundary direction in such a manner that the larger an absolute value of a difference is, the smaller a weighting given to the difference is.

It is preferable that the tone jump detecting section calculates a tone jump by performing weighted addition of the differences in a tile boundary direction in such a manner that a pixel value largely varying from its adjacent pixel value in the boundary line direction is given a small weighting, and the larger the variance is, the smaller the weighting is.

It is even preferable that the tone jump detecting section calculates smoothed values by smoothing the values of pixels near the tile boundary in a boundary line direction, calculates differences between the smoothed values of pixels located on both sides of the tile boundary, and calculates a tone jump in the tile distortion according to the differences.

It is preferable that the slope correcting section calculates a gradient of pixel values at the tile boundary, and adds the slope-like variation to the gradient in a direction that is approximately perpendicular to a direction of the gradient.

It is even preferable that the slope correcting section adds the slope-like variation to the values of pixels located on both sides of the tile boundary.

It is preferable that the slope correcting section adds the slope-like variation to the values of pixels located on one side of the tile boundary.

It is even preferable that when an image of W horizontal pixels×H vertical pixels is divided into tiles each of w horizontal pixels×h vertical pixels and the tiles are processed in a scanning order, the tone jump detecting section has a buffer of at least (W+h−1) pixels, and store, in the buffer, pixel values located on sidelines adjacent to a group of unprocessed tiles, among a group of tiles subjected to the tile distortion reduction processing, while updating the pixel values sequentially.

An image processing program according to the invention causes a computer to function as the image processing apparatus of any of the above items.

As described above, according to the invention, a tone jump in a tile distortion is detected from differences between the values of pixels located on both sides of a tile boundary and the tone jump is corrected into a gentle slope-like variation. As a result, it is obtainable of a good image with unnoticeable tile distortions.

BRIEF DESCRIPTION OF THE DRAWINGS

The nature, principle, and utility of the invention will become more apparent from the following detailed description when read in conjunction with the accompanying drawings in which like parts are designated by identical reference numbers, in which.

DESCRIPTION OF THE PREFERRED EMBODIMENTS

An embodiment of the present invention will be hereinafter described with reference to the drawings.

[Configuration of Embodiment]

Figure 1:
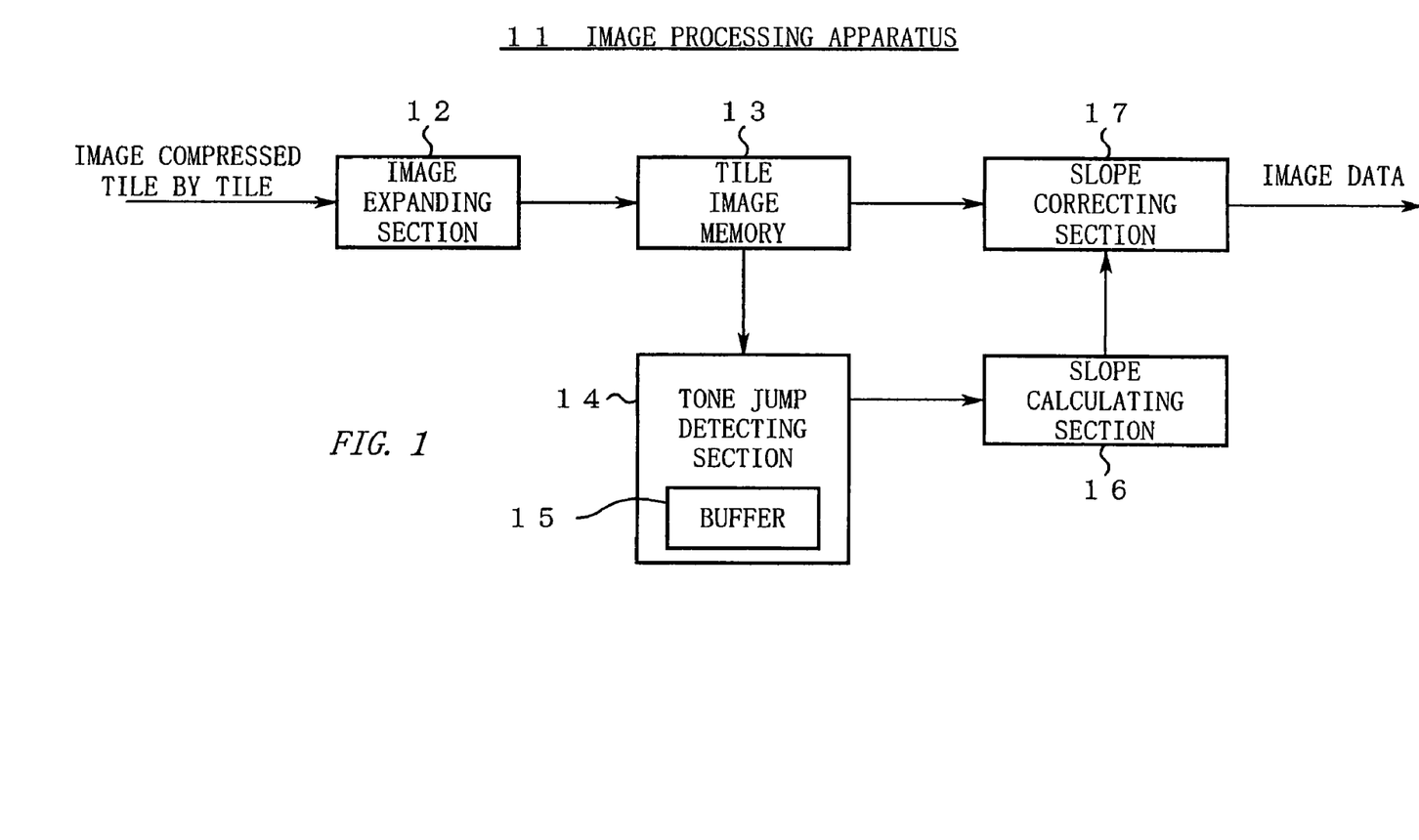
FIG. 1 shows the configuration of an image processing apparatus 11 according to an embodiment.

FIG. 1 shows the configuration of an image processing apparatus 11 according to the embodiment.

The image processing apparatus 11 has the following components:

(1) Image expanding section 12: Image-expands an image-compressed file of JPEG2000 on a tile-by-tile basis.

(2) Tile image memory 13: Stores an image-expanded tile temporarily.

(3) Tone jump detecting section 14: Detects tone jumps in a tile distortion according to differences between the values of pixels located on both sides of a tile boundary.

(4) Buffer 15: Has a storage capacity of at least (W+h−1) pixels, where W is the number of horizontally arranged pixels of an image and h is the number of vertically arranged pixels of a tile.

(5) Slope calculating section 16: Calculates slope-like correction values according to the tone jumps.

(6) Slope correcting section 17: Adds a slope-like variation to pixels in the vicinity of the tile boundary.

[Operation of Embodiment]

Figure 2:
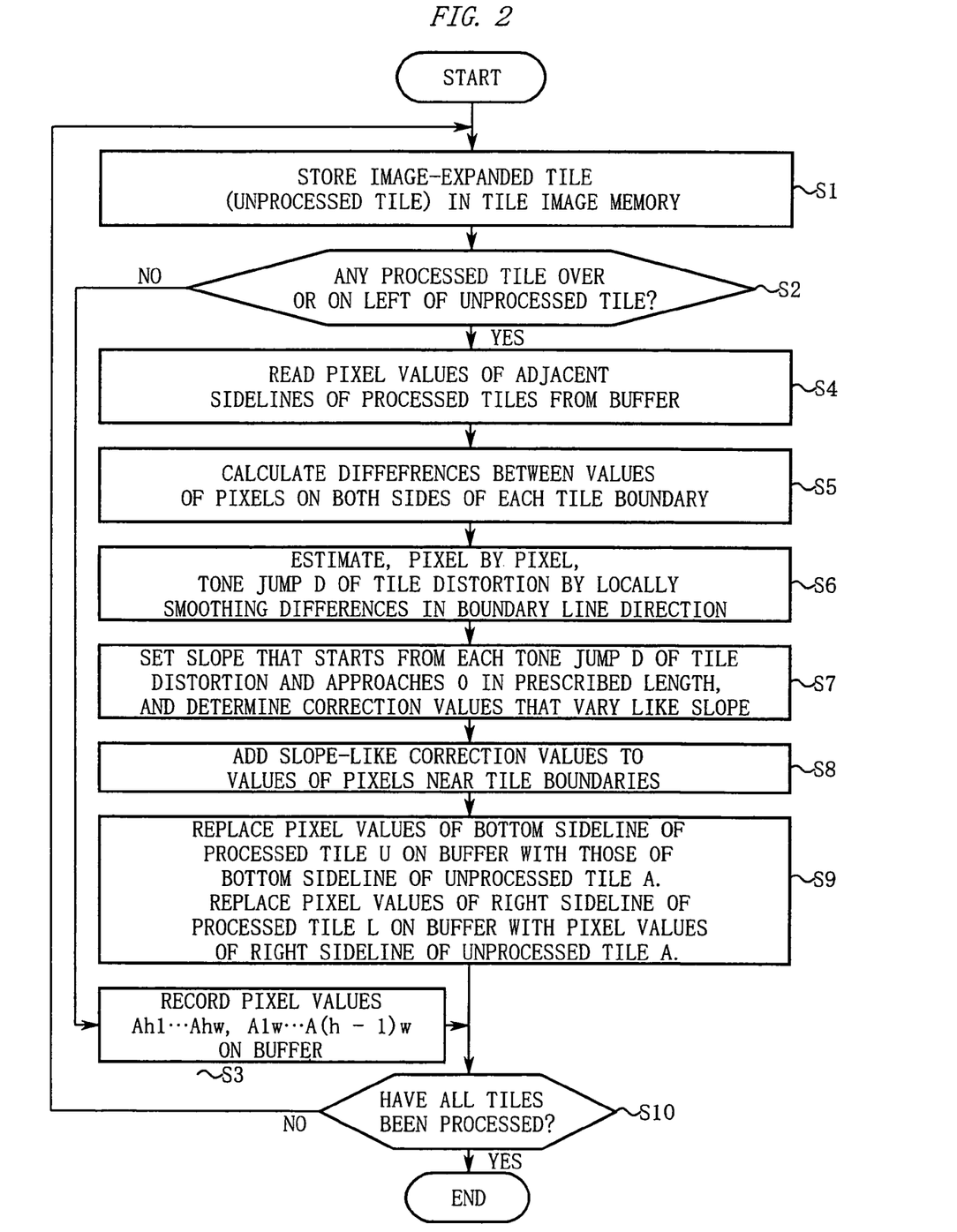
FIG. 2 is a flowchart showing an operation of the image processing apparatus 11.

FIG. 2 is a flowchart showing the operation of the image processing apparatus 11. The operation will be described below in order of step numbers shown in FIG. 2.

Step S1:

The image expanding section 12 receives an image-compressed file of JPEG2000 and performs image expansion (arithmetic decoding, entropy decoding, dequantization, and inverse wavelet transformation) on a tile-by-tile basis. The tile-by-tile image expansion is performed in the scanning order (a left tile to a right tile, a right end tile to the left end tile of the row immediately below) shown in FIG. 7.

A luminance component of an image-expanded unprocessed tile (i.e., a tile before being subjected to tile distortion reduction processing) is stored temporarily in the tile image memory 13.

Step S2:

The tone jump detecting section 14 judges whether a processed tile (i.e., a tile that has been subjected to tile distortion reduction processing) is present over or on the left of the unprocessed tile.

If there is an adjacent processed tile, the tone jump detecting section 14 moves to step S4.

If there is no adjacent processed tile (i.e., an unprocessed tile is at the top-left corner of the image), the tone jump detecting section 14 moves to step S3.

Figure 3:
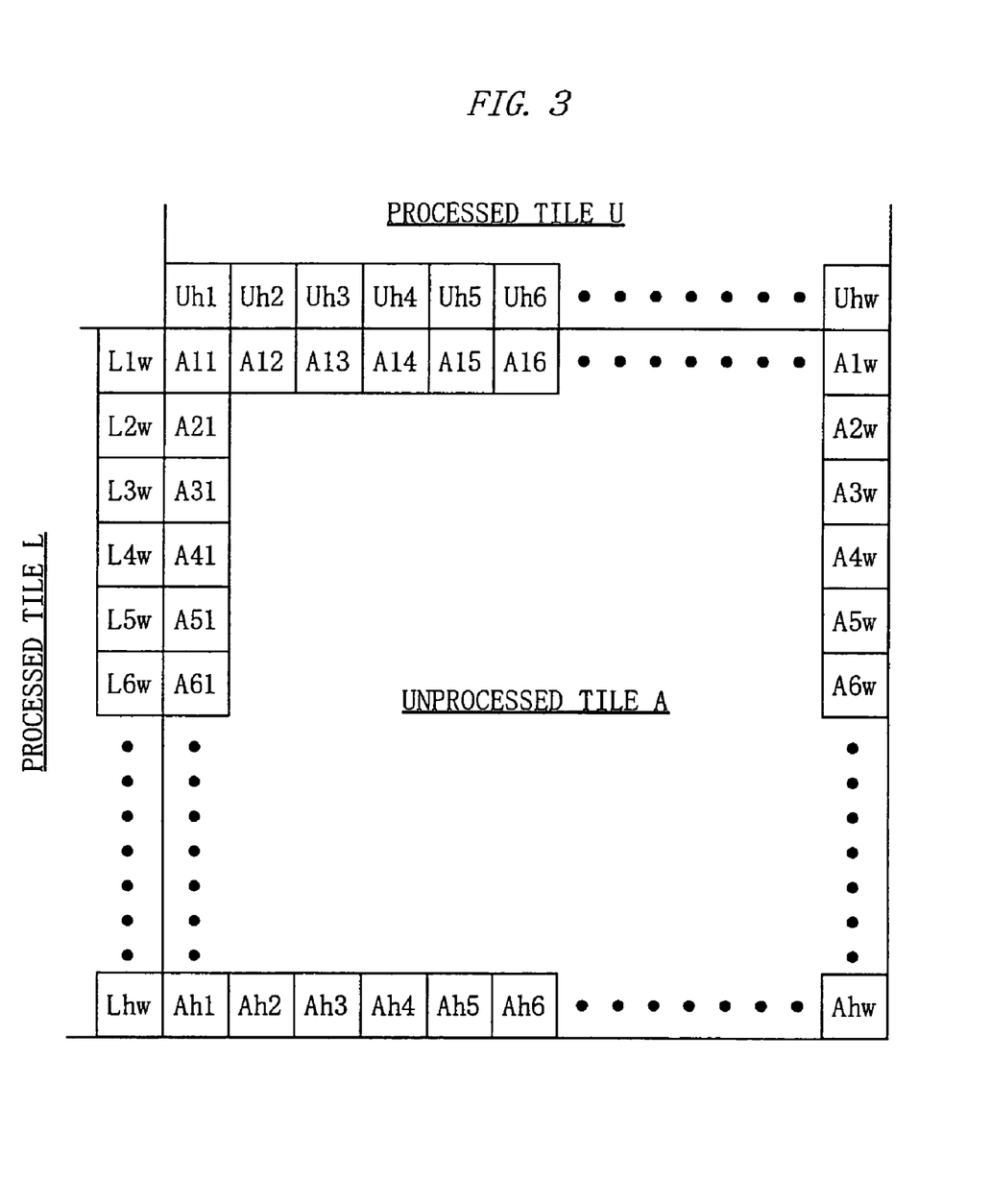
FIG. 3 illustrates tile boundaries.

Step S3:

The tone jump detecting section 14 temporarily stores, in the buffer 15, arrays of pixels on the bottom sideline (Ah1 to Ahw shown in FIG. 3) and the right sideline (A1w to A(h−1)w shown in FIG. 3) of the unprocessed tile. After this operation, the tone jump detecting section 14 moves to step S10.

Step S4:

The tone jump detecting section 14 reads pixel values of adjacent sidelines of processed tiles from the buffer 15.

For example, in the example of FIG. 3, the tone jump detecting section 14 reads bottom sideline pixel values Uh1 to Uhw of a processed tile U and right sideline pixel values L1w to Lhw of a processed tile L from the buffer 15.

Step S5:

The tone jump detecting section 14 calculates pixel value differences between the pixels located on both sides of each tile boundary.

For example, in the example of FIG. 3, the tone jump detecting section 14 subtracts top sideline pixel values A11 to A1w of the unprocessed tile A from the bottom sideline pixel values Uh1 to Uhw of the processed tile U, respectively. And the tone jump detecting section 14 subtracts left sideline pixel values A11 to Ah1 of the unprocessed tile A from the right sideline pixel values L1w to Lhw of the processed tile L, respectively.

Figure 4:
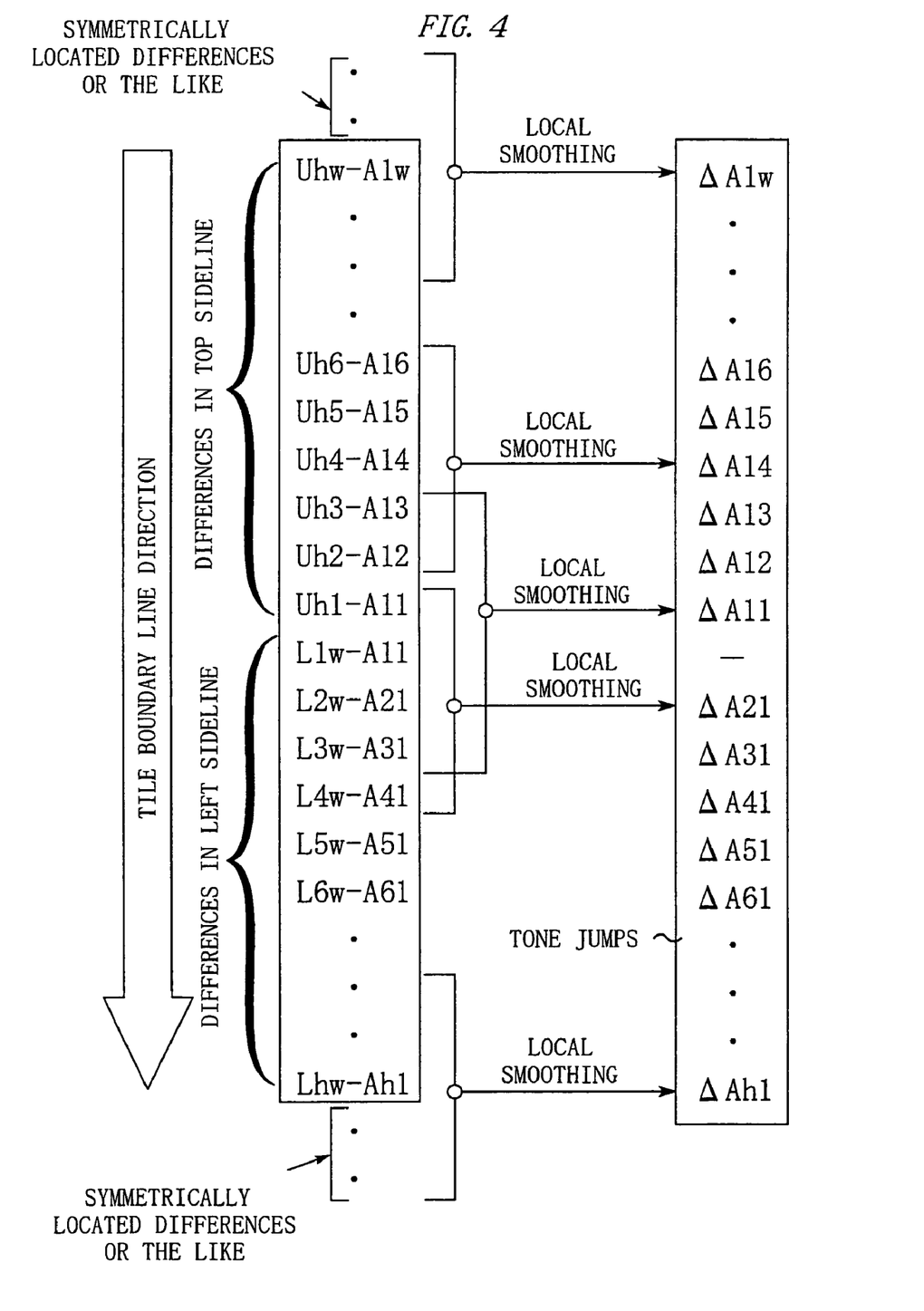
FIG. 4 illustrates how to calculate tone jumps.

Step S6:

As shown in FIG. 4, the tone jump detecting section 14 calculates tone jumps $\Delta A1w$ to $\Delta Ah1$ by locally smoothing the calculated differences in the boundary line directions.

In an end portion of each tile boundary line, the number of samples for local smoothing is insufficient. It is therefore preferable to add an insufficient number of samples by use of symmetrically located differences or extrapolation of differences.

As shown in FIG. 4, it is also preferable to deal with the top sideline and the left sideline of the unprocessed tile as a continuous tile boundary line. With this measure, the tile boundary line does not break at the top-left corner of the unprocessed tile and hence the necessary number of samples for local smoothing can be secured at the top-left corner. As a result, tone jumps (e.g., ΔA11) at and around the top-left corner can be calculated more correctly.

Specific examples of the local smoothing will be described below individually.

[1] Local Smoothing by Averaging

In general, a difference includes a tone jump Δ in a tile distortion that varies gently in a boundary line direction and high-frequency components that result from a pattern and image noise. Therefore, the tone jump Δ in the tile distortion can be detected by suppressing the high-frequency components by averaging in the boundary line direction.

[2] Local Smoothing by Weighted Addition

For example, where local difference samples are ($a_{-2}$, $a_{-1}$, $a_0$, $a_1$, $a_2$), a tone jump Δ is calculated by weighted addition according to the following equation:

$$\Delta = \frac{\sum_{k=-2}^{2} a_k \omega(k)}{\sum_{k=-2}^{2} \omega(k)} \quad (1)$$

where w(k) means weight allocation.

It is preferable that the weight allocation ω(k) be set so as to decrease as the inter-pixel distance (i.e., the absolute value of k) increases.

For example, the weight allocation ω(k) is set as follows:

$$\omega(-2)<\omega(-1)<\omega(0)>\omega(1)>\omega(2)$$

This kind of weight allocation makes it possible to correctly detect tone jumps Δ that occur at a tile boundary so as to have a relatively small length.

[3] Weight Allocation of Weighted Addition is Adjusted Depending on difference Variation A tone jump Δ is calculated by weighted addition according to Equation (1).

In doing so, the weight allocation ω(k) is adjusted depending on the difference variation according to the following equation:

$$\omega(k)=\exp[-(a_k-a_0)^2/\sigma^2] \quad (2)$$

In this equation, $\sigma^2$ is a coefficient for adjusting the variation length of the weight allocation and is set at about 10, for example (this also applies to the following description).

In this case, the weight allocation is suppressed more as the difference variation in the boundary line direction increases. As a result, the difference at a location where the difference varies greatly due to a pattern is not reflected in the tone jump Δ, which makes it possible to correctly detect tone jumps Δ having a small variation in a boundary line direction.

[4] Weight Allocation of Weighted Addition is Adjusted Depending on Difference

A tone jump Δ is calculated by weighted addition according to Equation (1).

In doing so, the weight allocation ω(k) is adjusted depending on the absolute value of the difference according to the following equation:

$$\omega(k)=\exp[-a_k^2/\sigma^2] \quad (3)$$

In this case, the weight allocation is suppressed more as the absolute value of the difference increases. As a result, the difference at a location having a large difference due to a pattern is not reflected in the tone jump Δ, which makes it possible to correctly detect very small tone jumps Δ.

[5] Weight Allocation of Weighted Addition is Adjusted Depending on Pixel Value Variation A tone jump Δ is calculated by weighted addition according to Equation (1).

In doing so, the weight allocation ω(k) is adjusted depending on the pixel value variation according to the following equation:

$$\omega(k)=\exp[-(A_k-A_0)^2/\sigma^2] \quad (4)$$

In this case, the weight allocation is suppressed more as the pixel value variation in the boundary line direction increases. As a result, tone jumps Δ can be detected correctly with importance attached to differences in a flat region of an image.

[6] Local Smoothing by Median Calculation or Mode Calculation

A median or a mode is determined from local difference samples and employed as a tone jump Δ.

In this case, tone jumps Δ that vary gently in a boundary line direction can be detected correctly by eliminating a sudden variation component due to a pattern or noise.

Step S7:

The slope calculating section 16 sets a slope that starts from each tone jump Δ in a tile distortion and approaches 0 in a prescribed length ((prescribed length)<(tile length)). It is preferable that the prescribed length be set at such a length as to render a steep tone jump unnoticeable. For example, the prescribed length may be set at a length of about four pixels.

Correction values (e.g., Δ, Δ, Δ/2, Δ/3) that vary like a slope are determined.

Figure 5:
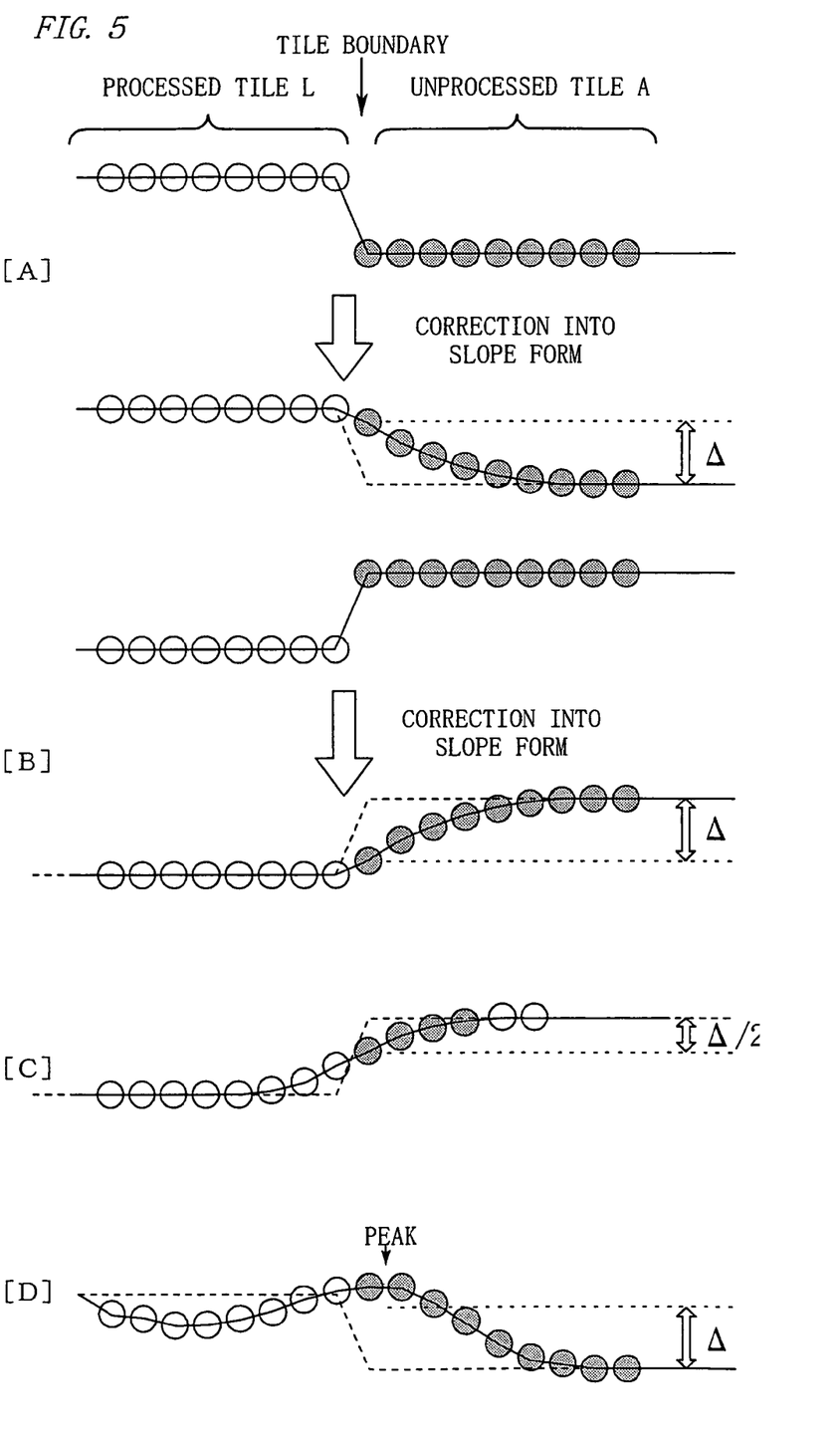
FIG. 5 shows show how a tone variation is corrected into a slope form.

Step S8:

The slope correcting section 17 adds slope-like correction values to portions, near the boundaries, of the unprocessed tile. As a result, as shown in FIGS. 5[A] and 5[B], steep tone jumps Δ at the tile boundaries are corrected to gentle slope-like variations and thereby made unnoticeable. (In FIG. 5, to help understand the concept, signal variations of a pattern itself are omitted. Actually, a pattern variation bridging both sides of a tile boundary is superimposed on a slope-like variation and the slope-like variation is made even less noticeable.)

Adverse influences on a pattern can further be suppressed by making an improvement in setting slope adding directions.

The slope adding directions will be described below with reference to FIG. 6.

Figure 6:
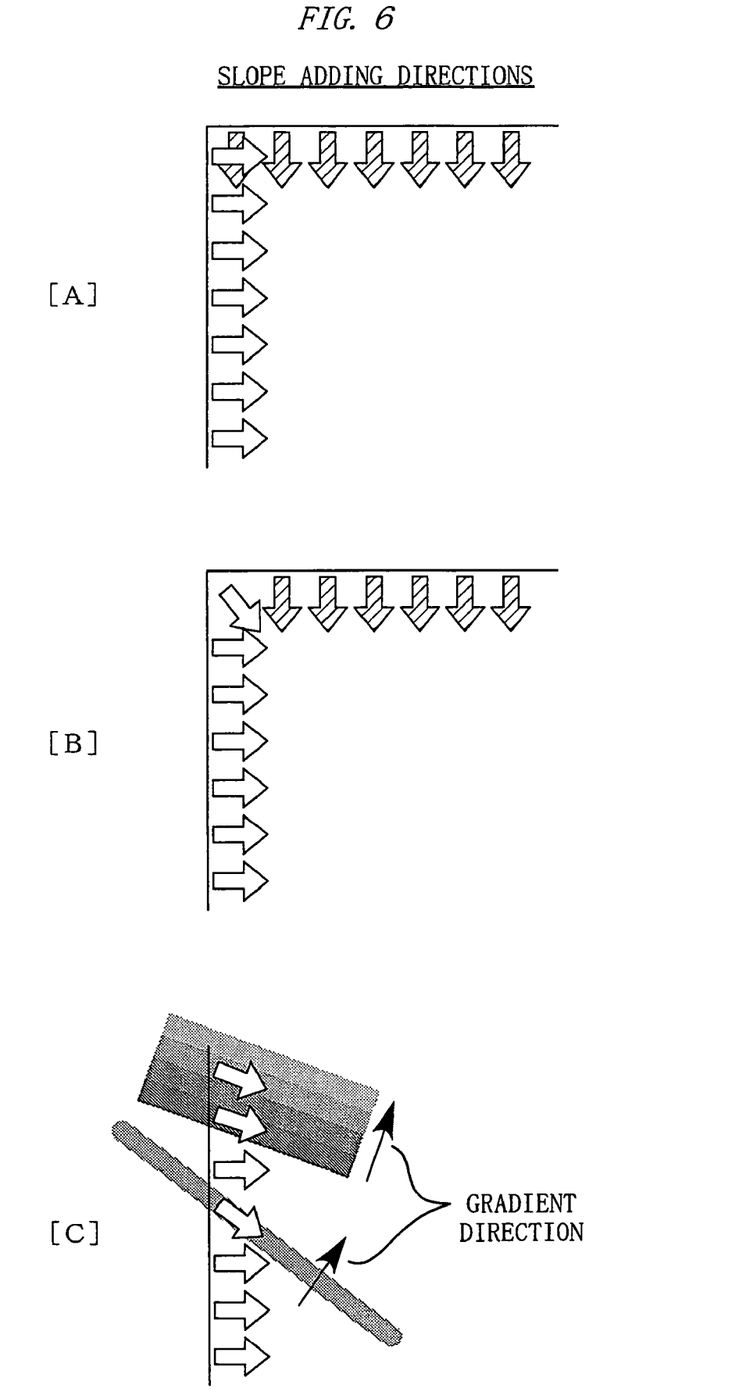
FIG. 6 shows slope adding directions.

In FIG. 6[A], a slope-like variation is added in the direction that is perpendicular to each tile boundary. In this case, it is preferable that slope-like variations be added in two stages, that is, by left-sideline-side processing (detection of left-sideline-side tone jumps and addition of left-sideline-side slopes) and top-sideline-side processing (detection of top-sideline-side tone jumps and addition of top-sideline-side slopes). This stepwise processing makes it possible to add slope-like variations in the two directions in the vicinity of the top-let corner of the unprocessed tile without causing any failure.

On the other hand, in FIG. 6[B], a slope-like variation is added in the direction toward the bottom-right corner in the vicinity of the top-let corner of the unprocessed tile. This can minimize superimposition on each other of slope-like variations in the vicinity of the top-let corner.

In FIG. 6[C], a gradient of pixel values is calculated at each tile boundary and slope-like variations are added in a direction that is approximately perpendicular to the gradient direction. In this case, since slope-like variations are added in the direction in which pixel value variations are gentle, adverse influences on a pattern can further be suppressed.

Step S9:

The tone jump detecting section 14 replaces the pixel values of the bottom sideline (Uh1 to Uhw shown in FIG. 3) of the processed tile U stored in the buffer 15 with the pixel values of the bottom sideline (Ah1 to Ahw in FIG. 3) of the unprocessed tile A.

Further, the tone jump detecting section 14 replaces the pixel values of the right sideline (L1$w$ to L(h−1)w in FIG. 3) of the processed tile L stored in the buffer 15 with the pixel values of the right sideline (A1$w$ to A(h−1)w in FIG. 3) of the unprocessed tile A.

Figure 7:
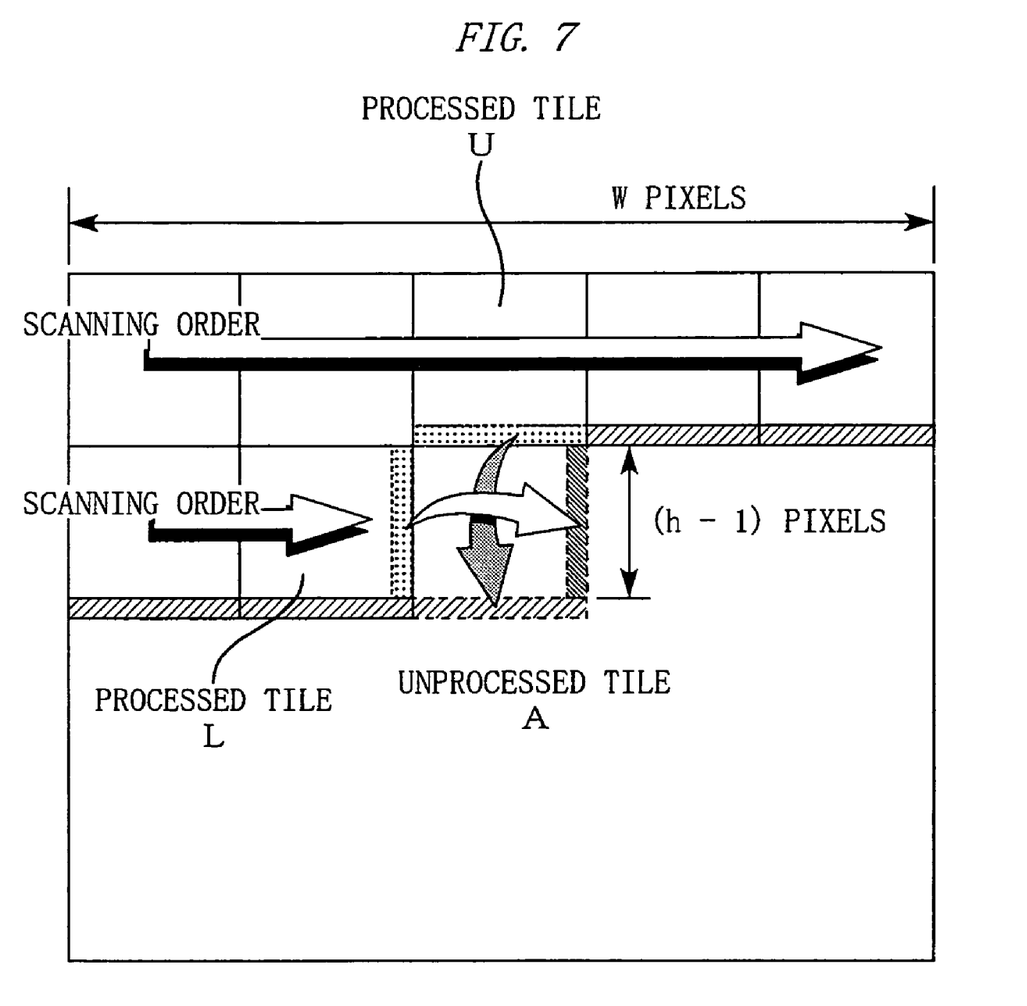
FIG. 7 illustrates an operation of updating the data stored in the buffer 15.

As shown in FIG. 7, this data updating allows latest pixel values of the sidelines, adjacent to the unprocessed tile group, of the processed tile group to be always stored in the buffer 15.

Since the maximum storage capacity needed of the buffer is a value corresponding to (W+h−1) pixels, the configuration of the image processing apparatus 11 can be simplified accordingly.

Step S10:

The image processing apparatus 11 judges whether or not all the tiles have been processed.

If not all the tiles have been processed yet, the image processing apparatus 11 returns to step S1 to repeat the operation again.

On the other hand, if all the tiles have been processed, the image processing apparatus 11 finishes the tile distortion reduction processing. A luminance component thus processed by the image processing apparatus 11 is combined with color difference components into component signals, which are output to the outside as a color image.

[Advantages etc. of Embodiment]

As described above, according to the embodiment, steep tone jumps due to a tile distortion are corrected into slope-like tone variations, whereby the tile distortion is rendered unnoticeable.

The above processing makes it possible to obtain a high-quality expanded image from even an image-compressed file of a high degree of compression. Conversely, it becomes possible to perform an even higher degree of image compression without the need for caring about tile distortions.

In the tone correction into a slope form, a slope-like variation and a pattern itself are mixed with each other gradually and hence fake edges are not prone to occur in an image. Further, in the tone correction into a slope form, unlike in the spatial frequency filtering, high-frequency components of an original pattern are not prone to be lost. For these reasons, the image processing according to the embodiment has only very small adverse influences on a pattern.

In the embodiment, a tone jump is calculated by locally smoothing differences in a boundary line direction of a tile. This local smoothing makes it possible to calculate tone jumps in a tile distortion correctly by eliminating pattern and noise variations from the differences.

In the embodiment, since smoothing is performed for each set of local difference samples, a local variation of tone jumps can be conserved. This makes it possible not only to add a fixed slope-like variation but also to add proper amounts of slope-like variations to individual local portions near a long tile sideline in a flexible manner. As a result, in sharp contrast to the conventional technique, the embodiment is free of the problem that when tone jumps are eliminated at one location on a long tile sideline new tone jumps appear at other locations.

In the embodiment, the local smoothing may be such that the weight allocation decreases as the difference variation increases. Usually, the influence of the variation component of an image pattern itself is great at a position where the difference variation is large. Therefore, tone jumps in a tile distortion can be detected more correctly by suppressing the weight allocation at positions where the difference variation is large.

In the embodiment, the local smoothing may be such that the weight allocation decreases as the difference increases. Usually, the influence of the variation component of an image pattern itself is great at a position where the difference is large. Therefore, tone jumps in a tile distortion can be detected more correctly by suppressing the weight allocation at positions where the difference is large.

In the embodiment, the local smoothing may be such that the weight allocation decreases as the pixel value variation in a boundary line direction increases. Usually, the influence of the variation component of an image pattern itself is great at a position where the pixel value variation is large. Therefore, tone jumps in a tile distortion can be detected more correctly by suppressing the weight allocation at positions where the pixel value variation is large.

In the embodiment, slope-like variations are added on only one side of a tile boundary (i.e., on the unprocessed tile side). Since it is not necessary to add slope-like variations to a processed tile that is located on the other side, the processing speed can be increased accordingly.

Further, in the embodiment, new pixel values of tile sidelines of processed tiles are stored in the buffer having a storage capacity of (W+h−1) pixels by overwriting the old values. Therefore, it is not necessary to hold an enormous amount of image data of processed tiles during processing, as a result of which the memory capacity necessary in the image processing apparatus 11 can be reduced greatly.

[Supplements to Embodiment]

In the above-described embodiment, pixel values that have been subjected to inverse wavelet transformation are processed. However, the invention is not limited to such a case. For example, the above-described processing may be performed on wavelet transformation coefficients. In this case, the above-described local smoothing can be omitted by calculating differences in a low-frequency subband.

Although the above-described embodiment is directed to the case of using JPEG2000, the invention is not limited to such a case. The invention can broadly be applied to general images including tile distortions.

In the above-described embodiment, the tile distortion reduction processing is performed on a luminance component. However, the invention is not limited to such a case. For example, tile distortion reduction processing may be performed on each color component. Or tile distortion reduction processing may be performed on only a color component including a largest part of a luminance component.

In the above-described embodiment, it is preferable to increase the slope variation length as the value of the tone jump Δ increases. In this case, the gradient of a slope variation is always kept small and hence tile distortions are rendered even less noticeable.

In the above-described embodiment, slope-like variations are added on only one side of a tile boundary. However, the invention is not limited to such a case. For example, as shown in FIG. 5[C], slope-like variations may be added on both sides of a tile boundary. In this case, it is satisfactory to add, for each tile, a slope whose height is about a half of each tone jump Δ. Therefore, adverse influences on a pattern can further be reduced. In this case, the prescribed length may set smaller than (tile length)/2 so as to prevent a phenomenon that slopes originating from confronting tile boundaries overlap with each other.

In the above-described embodiment, the slope may have any shape as long as it renders a tone variation less noticeable. The slope may have a straight shape or a curved shape.

Although in the above-described embodiment a monotonously decreasing or increasing slope is set, the slope of the invention is not limited to such a slope. For example, a slope may be set that is smoothly continuous with a pixel value variation (in particular, a low-frequency variation) near the boundary with an adjacent tile and approaches 0 on the other side. If the gradient of a pixel value variation near the boundary with an adjacent tile is such as to increase the tone jump, a slope having a peak may be added as shown in FIG. 5[D]. It is preferable to, for example, somewhat increase the prescribed with to make this kind of peak so gentle that ringing is prevented substantially.

The image processing apparatus 11 according to the embodiment may be implemented by hardware or implemented on a computer by software. And an image processing service according to the invention may be provided via communication lines such as the Internet.

In the above-described embodiment, each tone jump Δ is calculated by smoothing differences between the values of pixels located on both sides of a tile boundary. However, the invention is not limited to such a case. For example, each tone jump Δ may be calculated by processing shown in FIG. 8.

Figure 8:
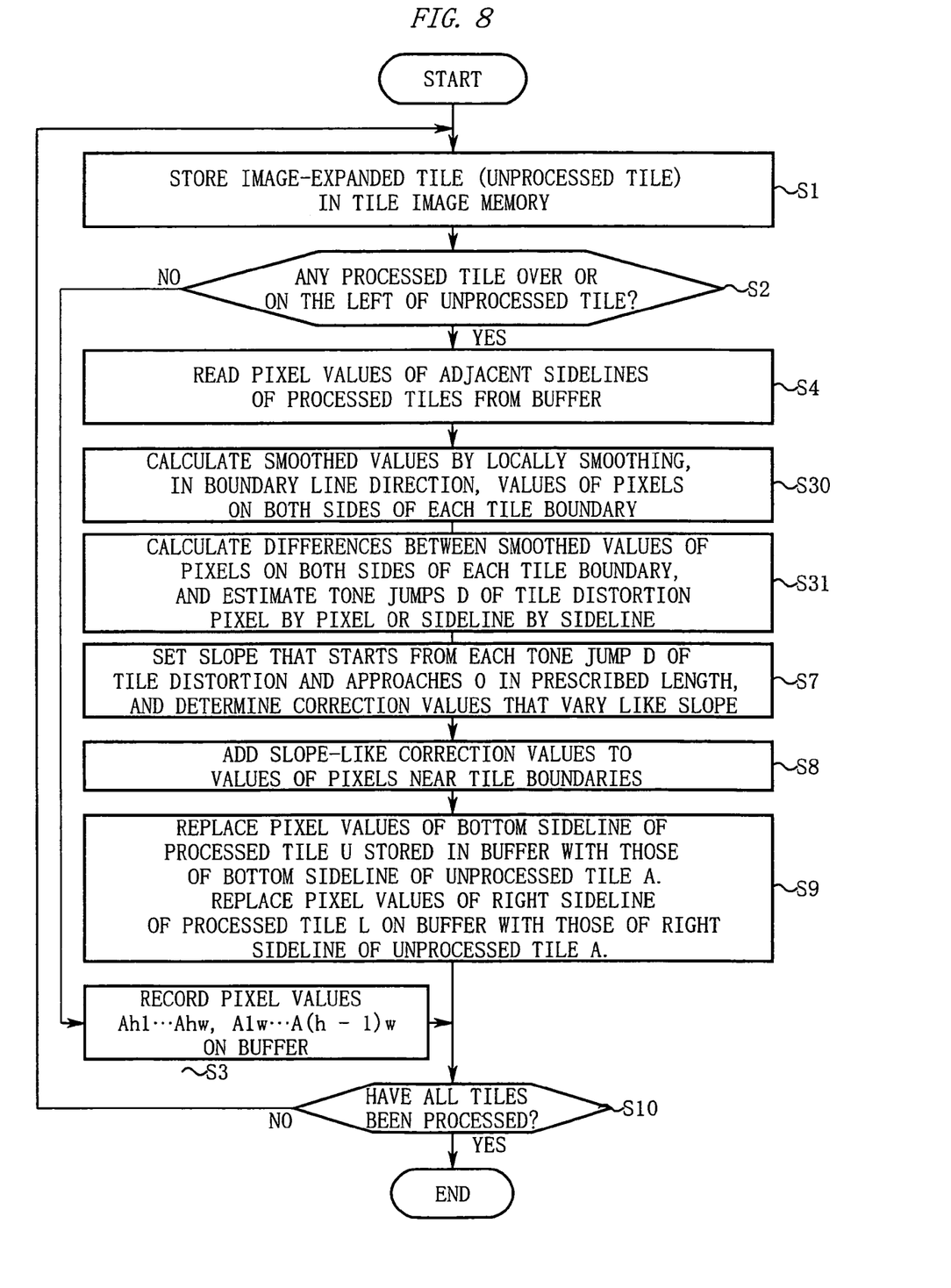
FIG. 8 is a flowchart showing another operation of the image processing apparatus

That is, first, the tone jump detecting section 14 calculates smoothed values by locally smoothing, in the boundary line direction, the values of pixels in the vicinities of each tile boundary (step S30 in FIG. 8). Then, the tone jump detecting section 14 calculates differences between the smoothed values of the pixels located on both sides of each tile boundary. The tone jump detecting section 14 estimates a tone jump Δ in a tile distortion on a pixel-by-pixel basis or a sideline-by-sideline basis according to the differences between the smoothed values (step S31 in FIG. 8). This processing can also calculate tone jumps Δ in a tile distortion with high accuracy by eliminating influences of an image structures.

The invention is not limited to the above embodiments and various modifications may be made without departing from the spirit and scope of the invention. Any improvement may be made in part or all of the components.

What is claimed is:

1. An image processing apparatus which reduces a tile distortion when an image is compressed or expanded on a tile-by-tile basis, the tile distortion being a distortion that occurs at a tile boundary, the apparatus comprising:
    a tone jump detecting section calculating differences between values of pixels located on both sides of the tile boundary and detecting a tone jump in the tile distortion according to the differences;
    a slope calculating section calculating slope-like correction values to be used for causing a value of the tone jump to approach zero in a prescribed length, the prescribed length<tile length; and
    a slope correcting section correcting the tone jump in the tile distortion into a gentle slope-like variation by correcting values of pixels near the tile boundary using the slope-like correction values, wherein
    said tone jump detecting section locally smoothes the differences in a tile boundary line direction, and calculates a tone jump in the tile distortion according to locally smoothed differences.

2. The image processing apparatus according to claim 1, wherein
    when an image of W horizontal pixels×H vertical pixels is divided into tiles each of w horizontal pixels×h vertical pixels and the tiles are processed in a scanning order, said tone jump detecting section has a buffer of at least (W+h−1) pixels, extracts, from a group of tiles subjected to tile distortion reduction processing, values of pixels on sidelines adjacent to a group of unprocessed tiles, and records the extracted pixel values on said buffer.

3. An image processing apparatus which reduces a tile distortion when an image is compressed or expanded on a tile-by-tile basis, the tile distortion being a distortion that occurs at a tile boundary, the apparatus comprising:
    a tone jump detecting section calculating differences between values of pixels located on both sides of the tile boundary and detecting a tone jump in the tile distortion according to the differences;
    a slope calculating section calculating slope-like correction values to be used for causing a value of the tone jump to approach zero in a prescribed length, the prescribed length<tile length; and
    a slope correcting section correcting the tone jump in the tile distortion into a gentle slope-like variation by correcting values of pixels near the tile boundary using the slope-like correction values, wherein
    said tone jump detecting section calculates a tone jump by performing weighted addition of the differences in a tile boundary direction in such a manner that a difference largely varying from an adjacent difference is given a small weighting, and the larger the variance is, the smaller the weighting is.

4. An image Processing apparatus which reduces a tile distortion when an image is compressed or expanded on a tile-by-tile basis, the tile distortion being a distortion that occurs at a tile boundary, the apparatus comprising:
    a tone jump detecting section calculating differences between values of pixels located on both sides of the tile boundary and detecting a tone jump in the tile distortion according to the differences;
    a slope calculating section calculating slope-like correction values to be used for causing a value of the tone jump to approach zero in a prescribed length, the prescribed length<tile length; and
    a slope correcting section correcting the tone jump in the tile distortion into a gentle slope-like variation by correcting values of pixels near the tile boundary using the slope-like correction values, wherein
    said tone jump detecting section calculates a tone jump by performing weighted addition of the differences in a tile boundary direction in such a manner that the larger an absolute value of a difference is, the smaller a weighting is given to the difference.

5. An image processing apparatus which reduces a tile distortion when an image is compressed or expanded on a tile-by-tile basis, the tile distortion being a distortion that occurs at a tile boundary, the apparatus comprising:
   a tone jump detecting section calculating differences between values of pixels located on both sides of the tile boundary and detecting a tone jump in the tile distortion according to the differences;
   a slope calculating section calculating slope-like correction values to be used for causing a value of the tone jump to approach zero in a prescribed length, the prescribed length<tile length; and
   a slope correcting section correcting the tone jump in the tile distortion into a gentle slope-like variation by correcting values of pixels near the tile boundary using the slope-like correction values, wherein
   said tone jump detecting section calculates a tone jump by performing weighted addition of the differences in a tile boundary direction in such a manner that a pixel value largely varying from an adjacent pixel value in the boundary line direction is given a small weighting, and the larger the variance is, the weighting is smaller.

6. An image processing apparatus which reduces a tile distortion when an image is compressed or expanded on a tile-by-tile basis, the tile distortion being a distortion that occurs at a tile boundary, the apparatus comprising:
   a tone jump detecting section calculating differences between values of pixels located on both sides of the tile boundary and detecting a tone jump in the tile distortion according to the differences;
   a slope calculating section calculating slope-like correction values to be used for causing a value of the tone jump to approach zero in a prescribed length, the prescribed length<tile length; and
   a slope correcting section correcting the tone jump in the tile distortion into a gentle slope-like variation by correcting values of pixels near the tile boundary using the slope-like correction values, wherein
   said tone jump detecting section calculates smoothed values by smoothing values of pixels near the tile boundary in a boundary line direction, calculates differences between the smoothed values of pixels located on both sides of the tile boundary, and calculates a tone jump in the tile distortion according to the differences.

7. An image processing apparatus which reduces a tile distortion when an image is compressed or expanded on a tile-by-tile basis, the tile distortion being a distortion that occurs at a tile boundary, the apparatus comprising:
   a tone jump detecting section calculating differences between values of pixels located on both sides of the tile boundary and detecting a tone jump in the tile distortion according to the differences;
   a slope calculating section calculating slope-like correction values to be used for causing a value of the tone jump to approach zero in a prescribed length, the prescribed length<tile length; and
   a slope correcting section correcting the tone jump in the tile distortion into a gentle slope-like variation by correcting values of pixels near the tile boundary using the slope-like correction values, wherein
   said slope correcting section calculates a gradient of pixel values at the tile boundary, and adds the slope-like variation to the gradient in a direction that is approximately perpendicular to a direction of the gradient.

* * * * *